Sept. 4, 1962 D. W. HANEY 3,052,407

DATA STORAGE DEVICE

Filed Dec. 19, 1958 4 Sheets-Sheet 1

INVENTOR
DONALD W. HANEY

BY *Donald F Voss*

ATTORNEY

Sept. 4, 1962 D. W. HANEY 3,052,407

DATA STORAGE DEVICE

Filed Dec. 19, 1958

4 Sheets-Sheet 2

Sept. 4, 1962 D. W. HANEY 3,052,407

DATA STORAGE DEVICE

Filed Dec. 19, 1958 4 Sheets-Sheet 3

Sept. 4, 1962 D. W. HANEY 3,052,407

DATA STORAGE DEVICE

Filed Dec. 19, 1958 4 Sheets-Sheet 4

United States Patent Office 3,052,407
Patented Sept. 4, 1962

3,052,407

DATA STORAGE DEVICE

Donald W. Haney, Vestal, N.Y., assignor to International Business Machines Corporation, New York, N.Y., a corporation of New York Filed Dec. 19, 1958, Ser. No. 781,637
5 Claims. (Cl. 235—61.11)

This invention relates to data storage devices and more particularly to devices for deriving information from perforated record cards fed at a predetermined cyclic rate and subsequently selectively furnishing the information asynchronously to apparatus controlled by or for processing the information.

Heretofore, it has been the practice to derive information from perforated record cards at a particular cyclic rate and store the information, and usually in some different coded form, in data storage devices such as magnetic drum storage devices, magnetic core storage devices, magnet tape storage devices, paper tape storage devices, electrostatic storage devices, electromagnetic storage devices, electronic storage devices, mechanical and electromechanical storage devices, and other data storage devices. These latter mentioned devices, while very useful and effective for storing data to meet a vast number of requirements of apparatus controlled by or for processing the data, are usually relatively expensive. More importantly, in many instances the particular data storage device could actually be a much simpler and inexpensive device to meet the requisites demanded by the apparatus which is controlled by or processes the data of the storage device.

The purpose of the present invention is to provide a simple, inexpensive, effective data storage device. This is achieved by an arrangement of apparatus for sensing the data stored in record cards in the form of perforations synchronously or at a predetermined cyclic rate and storing the record cards to permit selective sensing of the same asynchronously or at a subsequent time whereby the data originally made available at a particular cyclic rate, is again made available at random rates to enable further control or additional processing of the data by the same or other portions of the apparatus to which the data was originally made available. In the instant invention, the data is contained in the form of perforations in record cards; however, the principles of the invention would permit other embodiments.

Accordingly, it is a principal object of the invention to provide an improved data storage device which initially makes information available at a predetermined cyclic rate and subsequently selectively makes the same information available at an asynchronous rate.

Another very important object of the invention is to provide an improved data storage device which is simple, inexpensive and effective.

Other objects of the invention will be pointed out in the following description and claims and illustrated in the accompanying drawings, which disclose, by way of examples, the principle of the invention and the best mode, which has been contemplated, of applying that principle.

Figure 1:
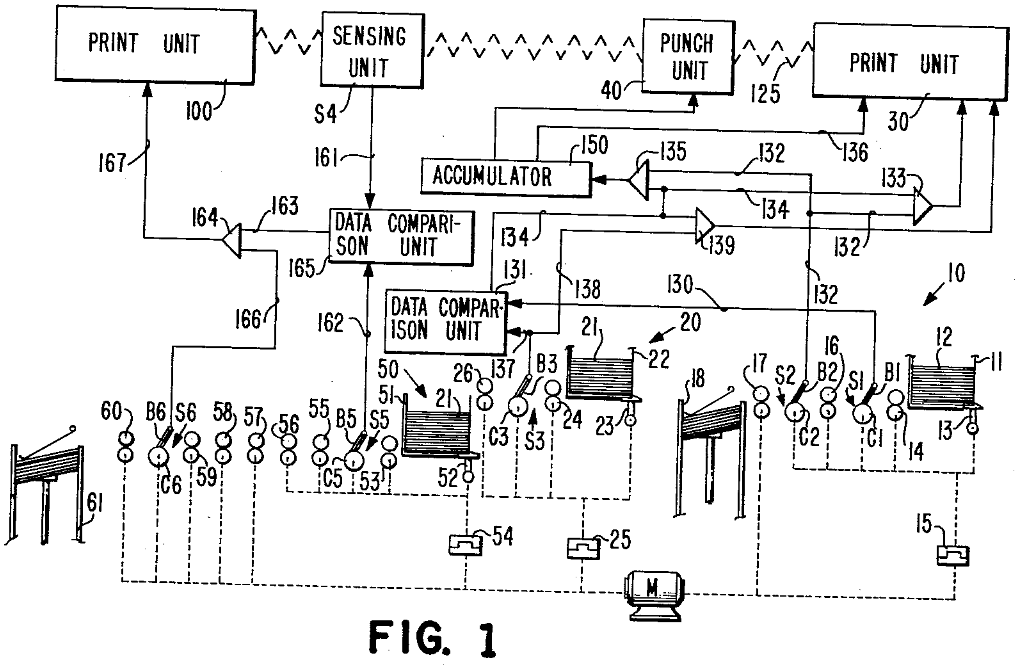
FIG. 1 is a diagrammatic representation of the data source and data storage apparatus for furnishing the data to the printing and punching apparatus operably controlled thereby.

Referring to the drawings, for purposes of example, the present invention is illustrated in FIG. 1 as first and second data sources 10 and 20 for making data available to printing and punching units 30 and 40, respectively. The data is made available to the printing unit 30 from the data sources 10 and 20 at a cyclic rate. Additionally, the data of the data source 20 is made available at a cyclic rate to a data storage unit 50. While data is entered into the data storage unit 50 at a cyclic rate, data is selectively transferred therefrom at an asynchronous rate to another printing unit 100 to print additional data upon the instrument or record document 125 which already bears printed data derived from the data source 10 and printed thereupon by the printing unit 30.

The particular example for illustrating the invention comprises apparatus for preparing record card documents 125 in continuous form such as utility bills, insurance premiums, and the like, where certain information such as the name and address of the customer appears on one side of the document and billing or amount data appears on the other side. The information on the record card documents is recorded in printed and punched form. The information recorded on the card documents is derived from a plurality of data sources including data source 10, an accumulator 150 and the data storage unit 50.

In addition to preparing the record card documents 125, the name and address and amount data is also recorded in printed form on one side of a register or continuous forms sheet 128 which is utilized for office record purposes. The information recorded on the register sheet is derived from the data sources 10 and 20 and from the accumulator 150. Since the entire data is printed upon one side of the register sheet 126 at the first printing unit 30, there is no need for storing the information so printed with respect to that document; hence, information from the data storage unit 50 is not utilized for effecting printing upon the register sheet. However, only amount data is printed upon the card documents 125 at the first printing unit 30. Accordingly, it is necessary to store the name and address information associated with the amount data, so that when the card documents 125 enter the printing unit 100, the name and address information will be available to enable the printing thereof on the opposite side of the card documents already bearing the amount data in both printed and punched form.

Usually the address information is stored in some type of storage unit such as electromagnetic, electromechanical, or electrostatic devices. However, in this invention, the simple, effective, inexpensive data storage unit 50 is provided, whereby name and address information will be made available at the proper time to the printing unit 100. Of course, as it will be pointed out in detail, certain checks or comparisons are made to insure that the name and address information is associated with the related amount data in order to insure that the customer receives the proper bill.

It is seen in FIG. 1 that the data source 10 includes a card hopper 11 for containing detail or data cards 12 bearing amount data which are adapted to be picked in the well-known manner by a conventional picker knife 13 to be presented to a pair of cooperating feed rolls 14. The picker knife 13 as well as the feed rolls 14 are clutch controlled by a clutch 15 to establish a driving connection with a motor M so that the detail cards 12 picked from the card hopper 11 will engage the feed rolls 14 and be fed thereby to enter between a row of sensing brushes B1 and a contact roll C1 at brush sensing station S1. The contact roll C1 is also controlled by the clutch 15; however, the first detail card 12 will be fed by the feed rolls 14 to but not so that the first row of index positions of the card will be between the brushes B1 and contact roll C1 in one operation of the clutch 15 which may be any suitable one revolution positive clutch controlled by a magnet, not shown. When the clutch 15 is again engaged, the impulse to the magnet for controlling the clutch 15 may occur before the one revolution thereof is completed so as to effect continuous operation, the detail cards are fed between the brushes B1 and contact roll C1 to engage cooperating feed rolls 16 which are also controlled by the clutch 15. If the clutch 15 were to latch at this particular time or after if the magnet for controlling the clutch 15 were impulsed twice in succession, but the third successive impulse did not occur, then the detail cards 12 would be fed by the feed rolls 16 just so that the leading edge of the card is between brushes B2 and a contact roll C2, the first row of index positions on the card 12 would not be in sensing position. When the clutch 15 is again engaged, the detail card 12 is fed by the feed rolls 16 between the sensing brushes B2 and contact roll C2 at brush sensing station S2 to a pair of constantly running, cooperating feed rolls 17 which feed the detail cards 12 to a card stacker 18.

The data derived from the detail cards 12 at the sensing station S1 by brushes B1 is transmitted over conductor 130 to a data comparison unit 131. The function of the data comparison unit 131 is to determine whether or not the data of the detail card 12 sensed at the sensing station S1 corresponds to the data from the data source 20. There are various checks which could be made, but, in this example, it is intended to compare the account number of the detail cards 12 with the account number of master cards 21 at the data source 20. Hence, if the account number of one of the detail cards 12 compares equal to the account number of one of the master cards 21, then an indication is provided that the detail card corresponds to the master card and vice versa and therefore the proper information will be recorded upon the card document 125 and register sheet 126. If it turns out that upon comparison of the account numbers, the master and detail cards are not related to each other, then by discretion of the machine operator, the results of the comparison may be utilized to selectively control the feeding of only the master or only the detail cards until there is an equal comparison.

The data derived from the detail cards 12 at the sensing station S2 is transmitted over the conductor 132 to a logical AND circuit 133 which also has an input 134 from the data comparison unit 131. The output of the logical AND circuit 133 is connected to the printing unit 30. The data of the detail cards 12 sensed at the sensing station S2 is also transmitted by the conductor 132 to a logical AND circuit 135 which additionally has an input connection 134 from the data comparison unit 131. The output of the AND circuit 135 is connected to the accumulator 150. Hence, at the time the logical AND circuits 133 and 134 are conditioned by the data comparison unit 131, amount data sensed at the sensing station S2 will be entered into the printing unit 30 and the accumulator 150. After the data is processed in the accumulator 150, it is also transmitted to the printing unit 30 over the conductor 136 to enable printing of the total amount on both the card document 125 and register sheet 126.

Figure 2:
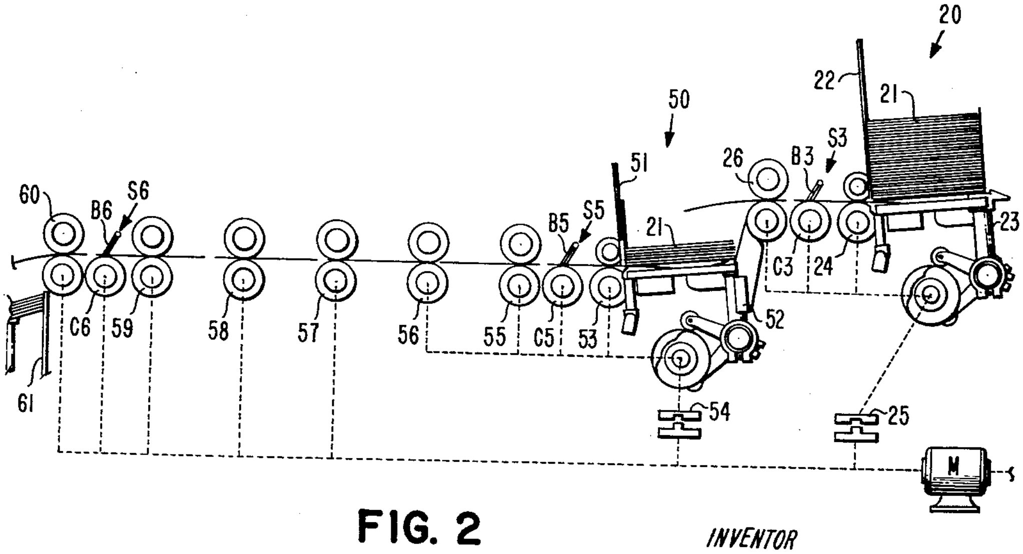
FIG. 2 is a front elevational view to illustrate the data storage apparatus.

Data is also made available to the printing unit 30 from the data source 20. The data is contained in name and address cards 21, and in this example, two cards 21 are utilized to contain the complete name and address of every customer. One card 21 contains the name, while the other card contains the street address, it is contemplated that the city and state will be preprinted. The named and address cards or master cards 21 contained in a card hopper 22 are adapted to be picked therefrom in seriatim by a picker knife 23. The picker knife 23 may be a conventional picker knife; however, in FIG. 2, it is shown as a picker knife of the type having vacuum assisting means which will be described in greater detail in connection with the data storage unit 50.

As the master cards 21 are picked from the card hopper 22, they engage a pair of cooperating feed rolls 24. The picker knife 23 and the feed rolls 24 are drivably connected to the motor M through a one revolution, positive clutch 25. The clutch 25 is similar to the clutch 15 in that it is controlled by a magnet, not shown, and is adapted to make one revolution and then latch up or become disengaged. However, the magnet for controlling the clutch 25 may be energized successively, so that the operation of the clutch may be continuous. In one operation of the clutch 25, the master cards 21 are picked from the card hopper 22 to be presented to the feed rolls 24 which convey the master cards 21 so that the leading edge thereof enters between sensing brushes B3 and contact roll C3 at brush sensing station S3. When the clutch 25 is again engaged or if it were permitted to operate continually, the master cards 21 will be fed between the sensing brushes B3 and contact roll C3 to engage cooperating feed rolls 26 which feed the cards 21 into a card hopper 51 of the data storage unit 50. In this manner, the master cards are fed from the data source 20 to the data storage unit 50 at a cyclic rate.

Data derived from the master cards 21 at the sensing station S3 is transmitted over a conductor 137 to the data comparison unit 131 and over a conductor 138 branching from conductor 137 to a logical AND circuit 139. The AND circuit 139 also has an input connection 134 from the data comparison unit 131. The output of the AND circuit 139 is connected to the printing unit 30. The information of the master cards 21 sensed at the sensing station S3 will enter the compare unit 131 simultaneously with the entry of data from the detail cards 12 sensed at the sensing station S1. The comparison unit 131 may be of the type well known in the art, such as that described in the patent to Ralph E. Page No. 2,359,670, dated October 3, 1944. The data of the master cards 21 sensed at the sensing station S3 will be passed by the AND circuit 139, when the same is conditioned by the data comparison unit 131, to the printing unit 30. In the event the data of the master card 21 and the detail card 12 were not related, the logical AND circuits 133, 135 and 139 would not be conditioned to pass information from the sensing station S2 to the printing unit 30 and accumulator 150 and from the sensing station S3 to the printing unit 30.

Figures 3, 4:
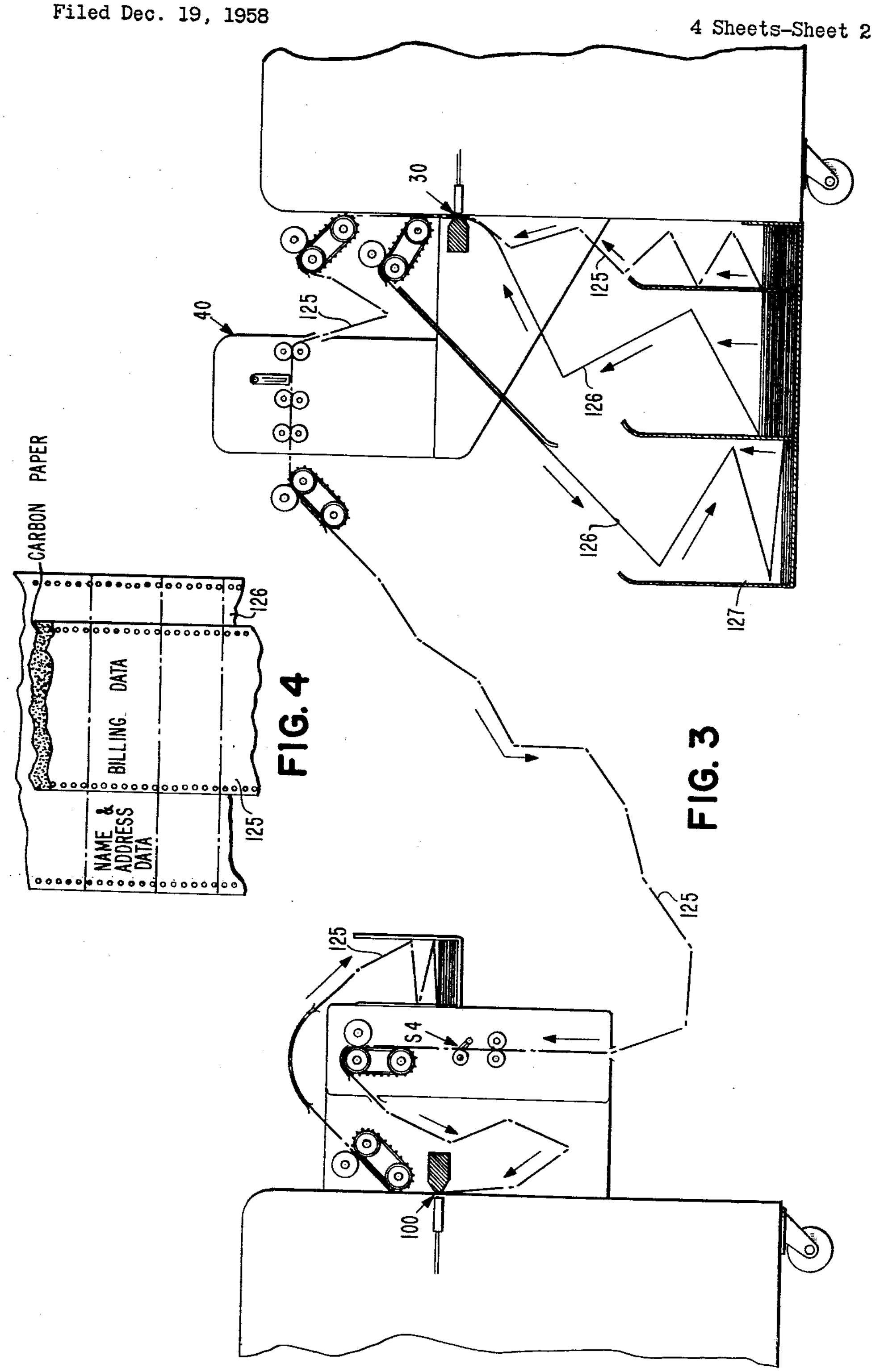
FIG. 3 is a schematic representation of the printing and punching apparatus.
FIG. 4 is a diagrammatic view to show the relationship between the card document and register sheet.

By the arrangement of apparatus so far described, it is seen that name and address data derived from the master cards 21 together with related amount data from the detail cards 12 and accumulated data from the accumulator 150 is available at the printing unit 30 to enable printing of the data. The printing unit 30 may be any suitable printing unit having print elements settable according to the data furnished. Printing takes place one line at a time on the card documents 125 and register sheets 126, which are successively line spaced during the printing operation. While both name and address and amount data is printed upon the register sheets 126 by the printing unit 30, only amount data is printed upon the card documents. Name and address data will be printed upon the side opposite of the amount data on the record cards 125 by the printing unit 100. The relationship of the register sheet 126 to the associated card document 125 at the printing unit 30 is shown in FIG. 4. The amount data printed upon the card documents 125 is original in form; however, the same information is printed upon the register sheets 126 through the facility of carbon paper interposed between the register sheets 126 and card documents 125.

Since the name and address information is printed upon the card documents 125 at the printing unit 100 which is located remote from the printing unit 30, it is necessary to preserve or store the information derived from the name and address or master cards 21 so that it will again be available when the card documents 125 are in position relative to the printing unit 100 to be printed upon.

The name and address information to accompany the amount data printed upon the card documents 125 at the printing unit 30 is stored in the data storage unit 50, FIG. 1. In order to appreciate the function of the data storage unit 50, the apparatus for performing remaining operations of recording data on the card documents 125 will be described. After the amount data has been printed upon the card documents 125 by the printing unit 30, the card documents 125 are transported by suitable apparatus for conveying card documents in continuous form to the punch unit 40, FIGS. 1 and 2. The punch unit 40 is of the type well known in the art for selectively perforating index positions of the record card documents and is adapted to operate while the card documents are in motion. This type of punch unit is described in detail in the patent to Clair D. Lake et al., No. 2,845,122, dated July 29, 1958.

The information entered into the card documents 125 in the form of perforations made by the punch unit 40 comes from the accumulator 150. The accumulator 150 is also of the type well known in the art which has the ability to accumulate amounts and retain the data accumulated until the data is transferred to the devices utilizing the data and in this instance, the printing unit 30 and the punch unit 40. The account number of the customer as well as the total amount of the bill is punched into the card documents 125. This permits the sensing of the account numbers of the card documents 125 before they enter the printing unit 100.

It may be noted in FIG. 3 that a small loop is formed in the continuous form card documents 125 just before the same enter the punch unit 40 and print unit 100. In this manner the punch unit 40 and printing units 30 and 100 may operate at their own speeds without close synchronization.

The record card documents 125 enter between sensing brushes B4 and contact roll C4 at sensing station S4, FIGS. 1 and 3, where the account number is sensed. This data is then transmitted over a conductor 161, FIG. 1, to a data comparison unit 165 which also receives like data from the data storage unit 50 via conductor 162. The data storage unit 50 will be described in detail shortly, however, an output conductor 163 of the data comparison unit 165 is connected to a logical AND circuit 164. When the logical AND circuit 164 is conditioned by the data comparison unit 165, it will pass information coming from the data storage unit 50 over conductor 166 to the printing unit 100 via conductor 167. The AND circuit 164 is conditioned to pass information coming from the data storage unit 50 when the account number of the card document 125 sensed at the sensing station S4 equals the account number of the master card 21 in the data storage unit 50.

In order for the proper name and address data to be presented to the printing unit 100, the master cards 21 are selectively fed from the card hopper 51 by means of a picker knife 52 to a pair of cooperating feed rolls 53. The picker knife 52 is of the type not requiring any weight or other element on the top of the stack of cards in the card hopper 51 for proper feeding of the cards. In this example, the picker knife is similar to the one disclosed in the patent application to W. J. Wheeler et al., Serial No. 783,921, Patent No. 3,002,751, filed December 30, 1958. The picker knife 52 and feed rolls 53 are connected to be driven from the motor M through a clutch 54 which is a one revolution positive clutch similar in structure to the clutch 25. The clutch 54 is engaged and disengaged by means of a magnet, not shown. In one revolution of the clutch 54, the master cards 21 are picked from the card hopper 51 to enter the bite of the cooperating feed rolls 53 which convey the master cards 21 just so that the leading edge thereof enters between sensing brushes B5 and a contact roll C5 at the sensing station S5, without engaging the first row of index positions on the card. Upon the next revolution of the clutch 54, which may occur in succession without the clutch first becoming disengaged, the feed rolls 53 feed the master cards between sensing brushes B5 and contact roll C5 to engage a pair of cooperating feed rolls 55 also controlled by the clutch 54. At the end of this revolution of the clutch 54, the master cards 21 are still under control of the feed rolls 55. Also, during this revolution of the clutch 54, the account number of the information sensed from the master cards 21 at the sensing station S5 is transmitted over conductor 162 to the data comparison unit 165, simultaneously with the entry of the account number of the record card document 125 sensed at the sensing station S4. Upon the next operation of the clutch 54, the master cards 21 are fed by the feed rolls 55 to a pair of cooperating feed rolls 56 which are also controlled by the clutch 54. The feed rolls 56, during this operation of the clutch 54, feed the master cards up to but not into the bite of cooperating feed rolls 57. The feed rolls 57 are constantly driven by the motor M. Hence, once a master card 21 is engaged by the feed rolls 57, it is fed without stopping to continuously running feed rolls 58 and from these feed rolls to continuously running feed rolls 59. The feed rolls 59 feed the master cards 21 between sensing brushes B6 and a contact roll C6 at a sensing station S6 to a pair of continuously running feed rolls 60 which feed the cards to a card stacker 61. The information sensed from the master cards 21 at the sensing station S6 is transmitted over conductor 166 to the logical AND circuit 164. If the AND circuit 164 has been conditioned by the data comparison unit 165, the name and address information will be passed to the printing unit 100. It should be noted that the card document 125 to be printed upon will be at this time in position relative to the printing unit 100 to receive print impressions. It should also be noted that while master cards 21 are picked from the card hopper 51 according to the demands imposed by the printing unit 100, the master cards 21 enter the card hopper 51 at a cyclic rate without regard to the demands of the printing unit 100. It should also be recognized that if the AND circuit 164 were not conditioned by the data comparison unit 165, the information sensed at the sensing station S6 would not enter the printing element 100. This would require the data storage unit 50 to operate, or master cards 21 to be fed from the card hopper 51 until the AND circuit 164 is conditioned by the data comparison unit 165; however, the master cards 21 would enter the card hopper 51 at the same cyclic rate.

*Machine Operation*

The card hoppers 11 and 22 are filled with detail cards 12 and master cards 21, respectively. The continuous form record card documents 125 and register sheets 126 are properly inserted so that the transport mechanism schematically illustrated but not described in detail will convey the card documents 125 and register sheets 126 into print position relative to the print elements of the printing unit 30.

Figure 5A:
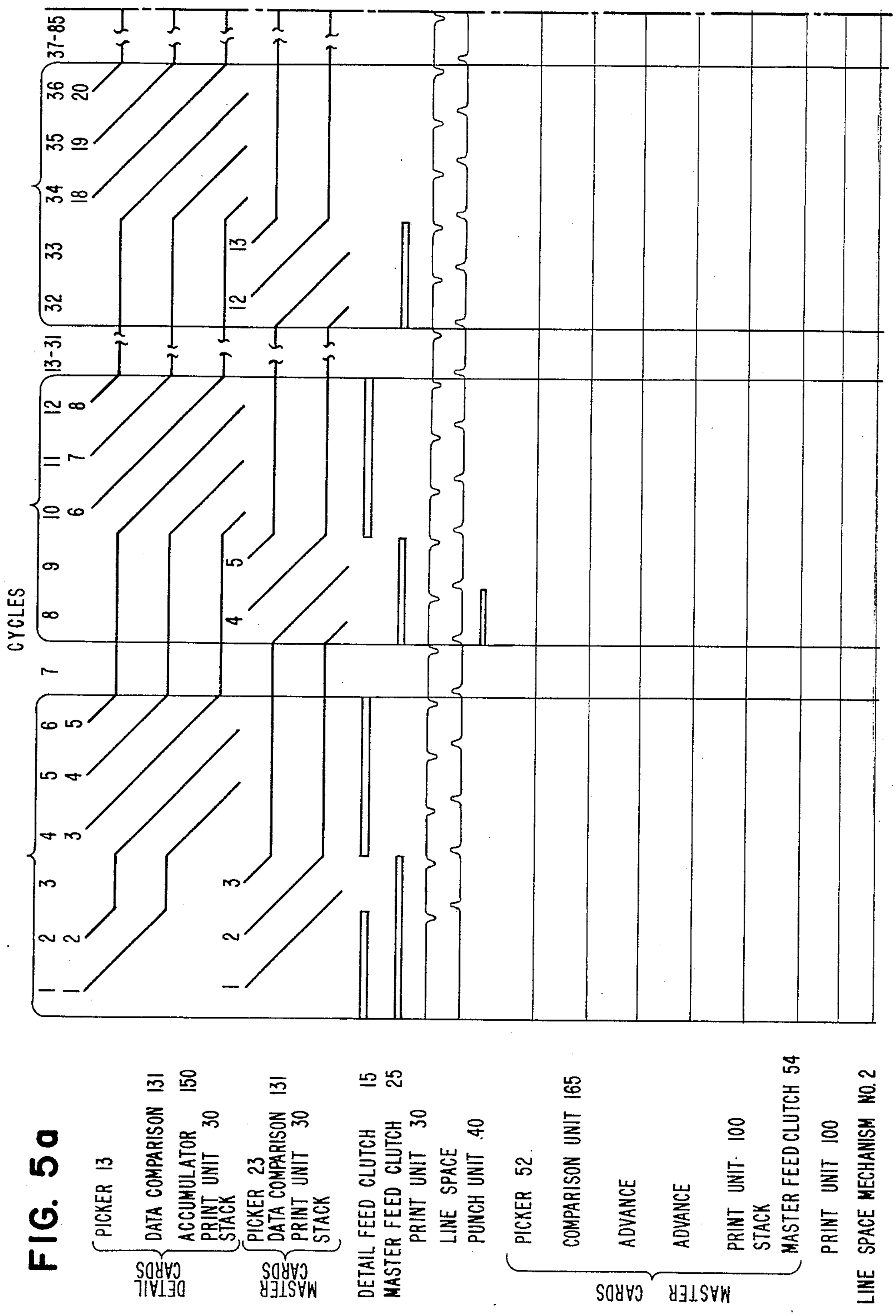
FIGS. 5*a* and 5*b*, with FIG. 5*a* disposed to the left of FIG. 5*b*, taken together constitute a timing diagram for the data sources and storage apparatus, and the printing and punching apparatus.
Figure 5B:
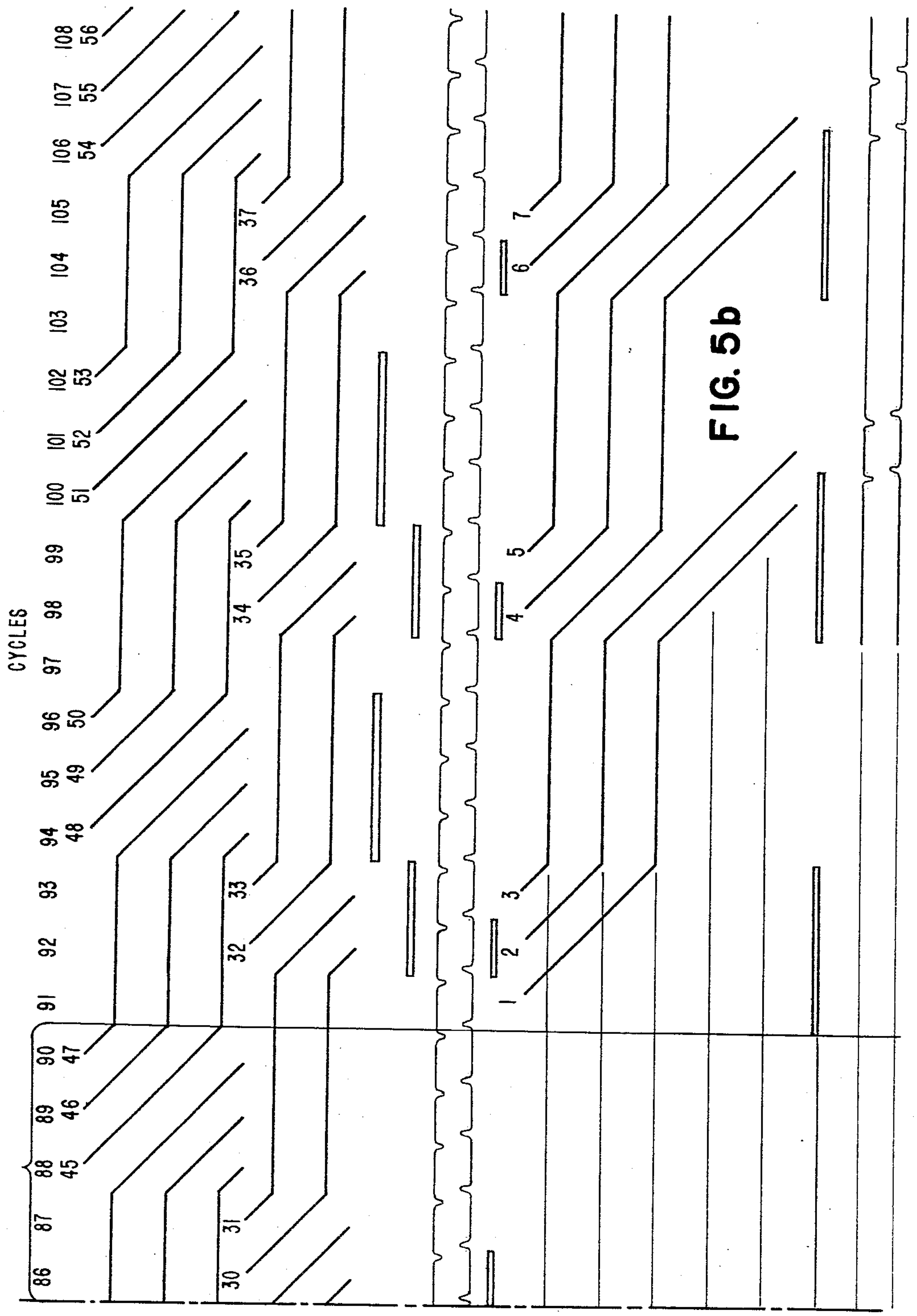

During the first cycle of operation, the detail cards 12 and master cards 21 are picked from their respective card hoppers 11 and 22 whereby they are transported relative to the respective sensing stations S1 and S3 in the second cycle of operation, as shown in FIG. 5*a*. The magnets for controlling the engagement of the clutches 15 and 25 are operated in this instance so that the feeding of the detail and master cards occurs simultaneously and continuously in succession for the first two cycles of operation.

During the second cycle of operation, information is sensed at the sensing stations S1 and S3 and transmitted to the data comparison unit 131 via conductors 130 and 137, respectively. Also, during this cycle of operation the name and account number of the customer is transmitted to the AND circuit 139 which is conditioned by an equal comparison of account numbers of master and detail cards so that the name and account number is printed upon the register sheet by the print elements at the first printing unit 30.

On the third cycle of operation, the clutch 15 is not engaged and therefore the detail cards 12 are not fed. However, the clutch 25 remains engaged and master cards 21 continue to feed as shown in FIG. 5*a*, the first master card enters the card hopper 51 during this cycle of operation, while second and third master cards will be residing with the feed rolls 26 and 24, respectively, the third master card has been fed to the sensing station S3, while the second master card has been fed through the sensing station S3 to the feed rolls 26. Hence, the information sensed from the second master card 12 is transmitted from the sensing station S3 to the data comparison unit 131 via conductor 137 and to the AND circuit 139 via the conductor 138. The account number of the second master card is compared with the account number of the first master card and detail card already in the data comparison unit 131. Assuming that the comparison of the account numbers is equal, the AND circuit 139 is conditioned to pass the address information to the print elements of the printing unit 30. The print elements of the printing unit 30 then operate to complete the printing of the name and address on the first register sheet 126. Of course, the register sheet 126 was line spaced one line before printing took place. The first and second detail cards 12 dwell during the third cycle of operation at the feed rolls 14 and 16, respectively.

Upon the fourth cycle of operation, the clutch 15 is engaged to continue the feeding of the first and second detail cards 12 and to start the feeding of the third detail card. However, during the fourth cycle, the clutch 25 is not engaged and therefore there is no feeding of master cards 21 from the card hopper 22 and the second and third master cards dwell at the feed rolls 24, and 26, respectively. The first detail card is sensed at the sensing station S2 during the fourth cycle of operation. Hence, the detail or amount data is transmitted via conductor 132 to AND circuits 133 and 135, respectively. The AND circuits 133 and 135 are conditioned by the data comparison unit 131 to pass the information to the printing unit 30 and accumulator 150. The register sheet 126 and card document are line spaced together and thereafter a line of amount data is simultaneously printed upon the card document 125 and register sheet 126. Printing takes place upon the register sheet 126 at this time by means of carbon paper. The information of the second detail card is sensed at this time at the sensing station S1 and is transmitted via conductor 130 to the data comparison unit 131. The third detail card is fed to the sensing station S1 but is not sensed during this cycle.

On the fifth cycle of operation, the card documents 125 and register sheet is line spaced, the clutch 15 remains engaged so that the first detail card enters the stacker 18, the second detail card is sensed at the sensing station S2, the third detail card is sensed at the sensing station S1, and the fourth detail card is picked and conveyed to the sensing station S1 but not sensed thereby. The information of the second detail card sensed at the sensing station S2 is transmitted via conductor 132 to the AND circuits 133 and 135. In this example, it is assumed that the data of the second detail card also pertains to the customer identified by the account number of the first detail card. Hence, the AND circuits 133 and 135 are conditioned by the data comparison unit 131 to pass information of the second detail card to the printing unit 30 and the accumulator 150, respectively. The data of the third detail card sensed at the sensing station S1 is transmitted via conductor 130 to the data comparison unit 131. It will be assumed that the account number of the third detail card is the same as that for the second detail card; hence, the equal comparison condition of the data comparison unit 131 will still exist. Since the AND circuit 133 was conditioned to pass information of the second detail card, the printing unit 30 will print another line of amount data on the card document 125 and underlying register sheet 126 which have already been line spaced. During the fifth cycle, the clutch 25 is not engaged, hence the second and third master cards remain or continue to dwell at the feed rolls 24 and 26, respectively.

On the sixth cycle of operation the card document 125 and associated register sheet 126 is line spaced; the clutch 15 remains energized to cause the second detail card to enter the stacker 18, the third detail card to be sensed by the sensing station S2, the fourth detail card to be sensed by the sensing station S1 and a fifth detail card to feed from the card hopper 11 to the sensing station S1. The clutch 25 is not energized during the sixth cycle, therefore, the second and third master cards continue to dwell at the feed rolls 24 and 26, respectively. The information of the third detail card sensed by the sensing station S2 is transmitted via conductor 132 to the AND circuits 133 and 135. Since the information of the third detail card relates to the first and second detail cards, it will be passed by the AND circuits 133 and 135 which were conditioned by the data comparison unit 131. The data of the third detail card is then accumulated together with data of the first and second detail cards and is also printed upon the card document 125 and associated register sheet 126. Since the account number of the fourth detail card disagreed with the account number already in the data comparison unit, the feeding of detail cards is stopped at the end of the sixth cycle.

On the seventh cycle of operation neither clutches 15 or 25 are engaged; hence, the third, fourth and fifth detail cards dwell while under control of feed rolls 14, 16 and 17, respectively; and the second and third master cards continue to dwell at feed rolls 24 and 26, respectively. During the seventh cycle the card document 125 and register sheet 126 are line spaced together and subsequently the accumulated data or total amount is printed on the card document 125 and register sheet 126 by the printing unit 30. With the total amount printed, the complete billing information has been printed upon the card document 125 and register sheet 126. It will be noted that the complete name and address has been printed upon the register sheet 126, but not on the card document 125.

Since the first card document 125 and register sheet have been printed upon by the printing unit 30, they may be advanced therefrom to permit another card document 125 and register sheet to come into printing position with respect to the printing unit 30. When the detail cards 12 are being fed and a change in account numbers is detected by the comparing unit 131, electrical impulses are directed to the control mechanism for the carriages or transport mechanism to eject the continuous card document 125 and register sheet 126. The action of printing upon the card document 125 and register sheet 126 just described continues in a like manner, but each card document 125 and register sheet 126 after the printing of the first card document 125 and register sheet 126, is printed upon by the print unit 30 in six cycles.

After the first card document 125 and register sheet 126 are printed upon by the print unit 30, the card document 125 progresses toward the punch unit 40 while the register sheet 126 progresses toward a stacker unit 127, FIG. 3. The first card document 125 is perforated at the punch station 40 to represent data of the account number and total amount of the bill. This information is supplied to the punch unit 40 from the accumulator 150 which has the facility of retaining the account number and total amount for each card document for twenty-four cycles. Hence, the first card document printed upon at the print unit 30 is punched during the thirty-second cycle or after four additional card documents have been printed upon. The first card document 125, which now has been printed upon one side with amount data and punched to contain perforations representing the account number and total amount, progresses towards the sensing station S4. As it will be pointed out shortly, each card document is counted when it leaves the print unit 30. The punch unit 40 is a fixed number of card documents away from the print unit 30. Hence, it is possible to provide a check for knowing if the proper card will be punched.

In order to insure that the master cards 21 and card documents 125 arrive at respective sensing stations S5 and S4, the impulses utilized to initiate ejection of a card document 125 from the print unit 30 are also utilized to control the clutch 54 which controls the picker knife 52. These impulses, however, are delayed by a relay ring counter, not shown, for the number of cycles that it takes for a card document 125 to travel from the printing unit 30 to the sensing station S4. In this example, the clutch 54 is engaged at the start of the ninety-first cycle or during the cycle that the total amount is being printed upon the fifteenth card document 125 by the printing unit 30. The clutch 54 remains energized for a sufficient period of time, three cycles, to permit the first and second master cards to be sensed by the sensing station S5. After three cycles, or at the end of the ninety-third cycle, the clutch 54 is disengaged and will not be engaged again until the start of the ninety-eighth cycle. The account number of the first master card sensed at the sensing station S5 is transmitted over conductor 162 to the data comparison unit 165, simultaneously with the account number of the first card document 125 sensed at sensing station S4 and transmitted to the data comparison unit 165 over conductor 161. The first card document 125 progresses toward the printing unit 100 and will arrive there to receive print impressions of name and address data of the first and second master cards sensed at the sensing station S6. Assuming that the account numbers of the first and second master cards compared equal to the account number of the first card document 125, the data comparison unit 165 conditions the AND circuit 164 to pass name and address data of the first and second master cards coming from the sensing station S6 over the conductor 166 to the printing unit 100.

The name of the customer, this data having been derived from the first master card 21, is printed upon the first card document during the ninety-ninth cycle. During the following cycle or the hundredth cycle, the first card document is line spaced and during the latter portion of this cycle receives print impressions of the street address, this data having been derived from the second master card during the first portion of the cycle. The first card document 125 is now completed. The preparation of successive card documents takes place in a like manner.

From the foregoing, it is seen that the present invention provides a simple, inexpensive, effective storage unit which is able to receive data at a cyclic rate and subsequently makes the data available at selected times to apparatus controlled by the data or for processing the data.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data storage device comprising a first record card hopper containing a plurality of record cards, a second record card hopper located a predetermined distance from said first record card hopper, first record card sensing means positioned between said first and second card hoppers, means for feeding records at a predetermined cyclic rate from said first to said second card hopper via said first record card sensing means, second record card sensing means adapted to sense record cards fed from said second card hopper and means for selectively feeding record cards from said second card hopper whereby the first record fed to said second card hopper is the first record fed therefrom to permit sensing by said second sensing means at a predetermined time after said first record was sensed by said first record card sensing means.

2. In a data storage device comprising a first record card hopper containing a plurality of record cards, a second card hopper located a predetermined distance from said first card hopper, first record card sensing means located between said first and second card hoppers, means for selectively feeding cards from said first card hopper to said second card hopper via said first record card sensing means, second record card sensing means adapted to sense record cards fed from said second card hopper, and means for selectively feeding cards from said second card hopper whereby the first record fed to said second card hopper is the first record fed therefrom to permit sensing by said second sensing means at a predetermined time after said first record card was sensed by said first record card sensing means.

3. In a data storage device comprising a first data sensing means; means for feeding records bearing data relative to said first data sensing means at a predetermined cyclic rate; a second data sensing means; means for receiving and storing said records after the same have been fed relative to said first data sensing means; and means for selectively feeding the records bearing data in the order received relative to said second data sensing means.

4. Apparatus for furnishing data to a plurality of data operably controlled devices comprising first and second record card readers, said first record card reader having a record card hopper and two spaced apart record card sensing stations, said second record card reader having a first record card hopper, a first sensing station, a second card hopper to receive the record cards after the same have been fed relative to said first sensing station, a second sensing station to receive record cards fed from said second card hopper and a third sensing station spaced a predetermined distance away from said second sensing station, said records being fed from said card hopper of the first card reader and the first and second card hoppers of the second card reader in a manner that the data operably controlled devices receive data from each of said sensing means in a manner to operate successively upon a single record element presented to the data operably controlled devices.

5. Apparatus of the type described comprising a first print unit; a second print unit spaced a predetermined distance away from said first print unit; means for feeding record elements into print position relative to said first and second print units in a manner that the number of record elements between said first and second print units is independent of the distance between said first and second print units; and a card reader having a first record card hopper, a first sensing station for sensing record cards fed from said first record card hopper, circuit means connecting said first sensing station with said first print unit, a second card hopper for receiving the cards fed relative to said first sensing station, a second sensing station adapted to sense record cards fed from said second card hopper, means for selectively feeding record cards from said second card hopper, and circuit means connecting said second sensing station to said second printing unit whereby data derived from a single record card may be first furnished to said first print unit and subsequently be furnished to said second print unit.

References Cited in the file of this patent

UNITED STATES PATENTS

| | | |
|---|---|---|
| 952,986 | Fischer et al. | Mar. 22, 1910 |
| 2,602,545 | Luhn et al. | July 8, 1952 |
| 2,656,103 | Curtis | Oct. 20, 1953 |
| 2,781,971 | Knutsen | Feb. 19, 1957 |
| 2,795,328 | Tyler et al. | June 11, 1957 |